(12) United States Patent
Zhu et al.

(10) Patent No.: US 7,739,666 B2
(45) Date of Patent: Jun. 15, 2010

(54) ANALYZING SOFTWARE USERS WITH INSTRUMENTATION DATA AND USER GROUP MODELING AND ANALYSIS

(75) Inventors: Wenli Zhu, Beijing (CN); Yantao Li, Beijing (CN); Qiang Wang, Beijing (CN); Haidong Zhang, Beijing (CN); Bing Sun, Beijing (CN); Shuguang Ye, Beijing (CN); Min Wang, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 309 days.

(21) Appl. No.: 11/818,610

(22) Filed: Jun. 15, 2007

(65) Prior Publication Data
US 2008/0313617 A1  Dec. 18, 2008

(51) Int. Cl.
*G06F 9/44* (2006.01)
(52) U.S. Cl. .................. 717/127; 714/38; 714/39
(58) Field of Classification Search .................. 717/127; 714/38, 39
See application file for complete search history.

(56) References Cited

U.S. PATENT DOCUMENTS

| | | |
|---|---|---|
| 5,500,941 A | 3/1996 | Gil |
| 5,542,070 A | 7/1996 | LeBlanc et al. |
| 5,548,718 A | 8/1996 | Siegel et al. |
| 5,619,709 A | 4/1997 | Caid et al. |
| 5,774,660 A | 6/1998 | Brendel et al. |
| 5,867,144 A | 2/1999 | Wyard |
| 5,903,886 A | 5/1999 | Heimlich et al. |
| 5,956,720 A | 9/1999 | Fernandez et al. |
| 6,046,741 A | 4/2000 | Hochmuth |
| 6,079,032 A * | 6/2000 | Peri .......................... 714/38 |
| 6,128,279 A | 10/2000 | O'Neil et al. |
| 6,131,082 A | 10/2000 | Hargrave, III et al. |
| 6,138,159 A | 10/2000 | Phaal |
| 6,144,962 A | 11/2000 | Weinberg et al. |

(Continued)

FOREIGN PATENT DOCUMENTS

EP         1083486        3/2001

(Continued)

OTHER PUBLICATIONS

Intel, VTune™ Performance Analyzer 8.1 for Linux Getting Started Guide, 2006.*

(Continued)

*Primary Examiner*—Paul L Rodriguez
*Assistant Examiner*—Aniss Chad
(74) *Attorney, Agent, or Firm*—Hope Baldauff Hartman, LLC (57) ABSTRACT

Described is a technology by which software instrumentation data collected from user program sessions are analyzed, including by determining program usage metrics and/or command usage metrics. Information representative of the program usage metrics and/or the command usage metrics is output, such as in the form of a report. The software instrumentation data may be further analyzed, such as to determine at least one usage trend over time, and to determine user groups. For example, a usage subset of sessions that meet specified session usage criteria based on a set of session data may be located, along with a subset of users based on users whose sessions meet specified user criteria. The usage and user subsets may be combined via Boolean logic to produce a result set.

17 Claims, 6 Drawing Sheets

U.S. PATENT DOCUMENTS

| | | | |
|---|---|---|---|
| 6,154,746 | A | 11/2000 | Berchtold et al. |
| 6,167,358 | A | 12/2000 | Othmer et al. |
| 6,182,139 | B1 | 1/2001 | Brendel |
| 6,233,570 | B1 | 5/2001 | Horvitz et al. |
| 6,237,138 | B1 | 5/2001 | Hameluck et al. |
| 6,237,143 | B1 | 5/2001 | Fontana et al. |
| 6,260,050 | B1 | 7/2001 | Yost et al. |
| 6,317,750 | B1 | 11/2001 | Tortolani et al. |
| 6,374,369 | B1 | 4/2002 | O'Donnell |
| 6,385,604 | B1 | 5/2002 | Bakalash et al. |
| 6,418,427 | B1 | 7/2002 | Egilsson et al. |
| 6,434,544 | B1 | 8/2002 | Bakalash et al. |
| 6,564,174 | B1 | 5/2003 | Ding et al. |
| 6,567,796 | B1 | 5/2003 | Yost et al. |
| 6,587,970 | B1 | 7/2003 | Wang et al. |
| 6,601,062 | B1 | 7/2003 | Deshpande et al. |
| 6,633,782 | B1 | 10/2003 | Schleiss et al. |
| 6,662,362 | B1 | 12/2003 | Arora et al. |
| 6,701,363 | B1 | 3/2004 | Chiu et al. |
| 6,714,940 | B2 | 3/2004 | Kelkar |
| 6,748,555 | B1 | 6/2004 | Teegan et al. |
| 6,754,312 | B1 | 6/2004 | Gundlach |
| 6,768,986 | B2 | 7/2004 | Cras et al. |
| 6,801,940 | B1 * | 10/2004 | Moran et al. ............... 709/224 |
| 6,816,898 | B1 | 11/2004 | Scarpelli et al. |
| 6,845,474 | B2 | 1/2005 | Circenis et al. |
| 6,862,696 | B1 | 3/2005 | Voas et al. |
| 6,901,347 | B1 | 5/2005 | Murray et al. |
| 6,901,536 | B2 | 5/2005 | Davenport |
| 6,912,692 | B1 | 6/2005 | Pappas |
| 6,963,826 | B2 | 11/2005 | Hanaman et al. |
| 7,003,766 | B1 | 2/2006 | Hong |
| 7,028,225 | B2 | 4/2006 | Maso et al. |
| 7,032,214 | B1 | 4/2006 | Rodrigues et al. |
| 7,039,166 | B1 | 5/2006 | Peterson et al. |
| 7,062,483 | B2 | 6/2006 | Ferrari et al. |
| 7,111,282 | B2 * | 9/2006 | Stephenson ............... 717/130 |
| 7,117,208 | B2 | 10/2006 | Tamayo et al. |
| 7,131,070 | B1 | 10/2006 | Motoyama et al. |
| 7,171,406 | B2 | 1/2007 | Chen et al. |
| 7,185,231 | B2 | 2/2007 | Mullally et al. |
| 7,194,386 | B1 | 3/2007 | Parikh et al. |
| 7,197,447 | B2 | 3/2007 | Susskind |
| 7,216,341 | B2 * | 5/2007 | Guarraci ............... 717/127 |
| 7,315,849 | B2 | 1/2008 | Bakalash et al. |
| 7,333,982 | B2 | 2/2008 | Bakalash et al. |
| 7,392,248 | B2 | 6/2008 | Bakalash et al. |
| 7,401,331 | B2 | 7/2008 | Leung |
| 2001/0044705 | A1 | 11/2001 | Vardi et al. |
| 2002/0083003 | A1 | 6/2002 | Halliday et al. |
| 2002/0144124 | A1 | 10/2002 | Remer et al. |
| 2003/0009507 | A1 | 1/2003 | Shum |
| 2003/0115207 | A1 | 6/2003 | Bowman et al. |
| 2004/0049505 | A1 | 3/2004 | Pennock |
| 2004/0088699 | A1 | 5/2004 | Suresh |
| 2004/0117760 | A1 | 6/2004 | McFarling |
| 2004/0122646 | A1 | 6/2004 | Colossi et al. |
| 2004/0133882 | A1 * | 7/2004 | Angel et al. ............... 717/130 |
| 2004/0191743 | A1 | 9/2004 | Chiu et al. |
| 2004/0230858 | A1 | 11/2004 | Susskind |
| 2005/0015683 | A1 | 1/2005 | Clark et al. |
| 2005/0021293 | A1 | 1/2005 | Elbel et al. |
| 2005/0065910 | A1 | 3/2005 | Welton et al. |
| 2005/0071807 | A1 | 3/2005 | Yanavi |
| 2005/0081206 | A1 | 4/2005 | Armstrong et al. |
| 2005/0125777 | A1 | 6/2005 | Calder et al. |
| 2005/0131924 | A1 | 6/2005 | Jones |
| 2005/0182750 | A1 | 8/2005 | Krishna et al. |
| 2005/0183143 | A1 | 8/2005 | Anderholm et al. |
| 2005/0278290 | A1 | 12/2005 | Bruce et al. |
| 2006/0075399 | A1 | 4/2006 | Loh et al. |
| 2006/0106793 | A1 | 5/2006 | Liang |
| 2006/0116981 | A1 | 6/2006 | Krimmel et al. |
| 2006/0174346 | A1 | 8/2006 | Carroll et al. |
| 2006/0218138 | A1 | 9/2006 | Weare |
| 2006/0242636 | A1 | 10/2006 | Chilimbi et al. |
| 2006/0242638 | A1 | 10/2006 | Lew et al. |
| 2006/0259981 | A1 | 11/2006 | Ben-Shoshan |
| 2007/0016672 | A1 | 1/2007 | Wilson et al. |
| 2007/0033201 | A1 | 2/2007 | Stienhans |
| 2007/0038974 | A1 | 2/2007 | Albahari et al. |
| 2007/0038983 | A1 | 2/2007 | Stienhans |
| 2007/0039009 | A1 | 2/2007 | Collazo |
| 2007/0101311 | A1 | 5/2007 | Castelli et al. |
| 2008/0127120 | A1 | 5/2008 | Kosche et al. |
| 2008/0312899 | A1 | 12/2008 | Li et al. |
| 2008/0313149 | A1 | 12/2008 | Li et al. |
| 2008/0313184 | A1 | 12/2008 | Li et al. |
| 2008/0313213 | A1 | 12/2008 | Zhang et al. |
| 2008/0313507 | A1 | 12/2008 | Mahmud et al. |
| 2008/0313633 | A1 | 12/2008 | Zhu et al. |

FOREIGN PATENT DOCUMENTS

| | | |
|---|---|---|
| WO | WO 00/75814 | 12/2000 |
| WO | WO 01/75678 | 10/2001 |

OTHER PUBLICATIONS

Intel, VTune™ Performance Analyzer 8.0 for Windows, 2006.*

"Usage Analytics For Rich Internet Applications (RIA)", Cambridge, MA, 2006.

Jeffrey Voas, "Third-Party Usage Profiling: A Model for Optimizing the Mass-Marketed Software Industry", Reliable Software Technologies, Sterling, VA.

Bowring et al., "Monitoring Deployed Software Using Software Tomography", 2002, ACM Press, NY, USA, 8 pages.

Corbett et al., "Bandera: Extracting Finite state Models from Java Source Code", 2000, Proceedings of the 22nd Intl. Conference on Software Engineering, pp. 439-448.

Donnell, Jack, "Java* Performance Profiling using the VTune™ Performance Analyzer" 2004, White Pater, Intel, 8 pages.

Farina et al, "Representing Software Usage Models with Stochaistic Automata Networks", Jul. 15-19, 2002, SEKE '02, pp. 401-407.

Fischer, "User Modeling in Human-Computer Interaction", 2001, User Modeling and User-Adapted Interaction 11, pp. 65-86.

Gokhaie et al., "Software Reliability Analysis Incorporating Fault Detection and Debugging Activities", Nov. 1998, The 9th International Symposium on Software Reliability Engineering, 10 pages.

Intel® VTune™ Performance Analyzer 7.2, 2005, 3 pages.

Jiawei et al., "Stream Cube: An Architecture for Multi-Dimensional Analysis of Data Streams", 2005, Distributed and Parallel Databases, v. 18, pp. 173-197.

Kratky, Michal, "Multi-dimensional Approach to Indexing XML Data", 2004, Ph.D Thesis, Department of Computer Science, Technical University of Ostrava, Czech Republic, 127 pages.

Li, Xiaolei, et al., "High-Dimensional OLAP: A Minimal Cubing Approach", 2004, Proceedings of the 30th VLDB Conference, , pp. 528-539.

Li, Xiaoming, et al., "Analyzing the Uses of a Software Modeling Tool", 2006, LDTA, pp. 1-18.

Linton et al., "Building User and Expert Models by Long-Term Observation of Application Usage", 1999, Proceedings of the 7th Intl. conference on User Modeling, pp. 129-138.

Nagappan et al., "Towards a Metric Suite for Early Software Reliability Assessment", 2003, Fast Abstract at the International Symposium on Software Reliability Engineering (ISSRE) 2003, Denver, CO., 2 pages.

Neal et al., "Playback: A Method for Evaluating the Usability of Software and Its Documentation", Dec. 1983, CHI '83 Proceedings, pp. 78-82.

Orlandic et al., "Inverted-Space Storage Organization for Persistent Data of Very High Dimensionality", 2001, International Conference on Information Technology: Coding and Computing (ITCC '01), 6 pages.

Puerta et al., "XIML: A Common Representation for interaction Data", Jan. 13-16, 2002, IUP02, pp. 214-215.

Rosenberg, et al., "Software metrics and reliability", Nov. 1998, 9th International Symposium on Software Reliability, Germany, 8 pages.

Shah, Biren, "On Improving Information Retrieval Performance from Structured, Semistructured and Un-structured Information Sources", Fall 2005, Dissertation, University of Louisiana at Lafayette, 198 pages.

Titzer et al., "Nonintrusive Precision Instrumentation of Microcontroller Software", Jul. 2005, ACM SIGPLAN Notices, vol. 40, Issue 7, pp. 59-68.

U.S. Official Action dated Aug. 6, 2009 in U.S. Appl. No. 11/818,600.

U.S. Official Action dated Oct. 5, 2009 in U.S. Appl. No. 11/818,612.

U.S. Official Action dated Sep. 4, 2009 in U.S. Appl. No. 11/818,879.

U.S. Official Action dated Oct. 7, 2009 in U.S. Appl. No. 11/818,607.

U.S. Official Action dated Jul. 24, 2009 in U.S. Appl. No. 11/818,596.

U.S. Notice of Allowance / Allowability dated Dec. 22, 2009 in U.S. Appl. No. 11/818,612.

U.S. Notice of Allowance / Allowability dated Jan. 6, 2010 in U.S. Appl. No. 11/818,879.

U.S. Notice of Allowance / Allowability dated Dec. 17, 2009 in U.S. Appl. No. 11/818,596.

U.S. Notice of Allowance / Allowability dated Feb. 17, 2010 in U.S. Appl. No. 11/818,600.

* cited by examiner

FIG. 1

| Session ID | Mem size | CPU | App | Exit type | User ID | ... |
|---|---|---|---|---|---|---|
| 0 | 223M | 1GHz | Word | Normal | 0 | ... |
| 1 | 511M | 2GHz | Word | Crash | 3 | ... |
| 2 | 512M | 733MHz | Word | Normal | 1 | ... |
| 3 | 768M | 1GHz | Excel | Normal | 0 | ... |
| 4 | 1024M | 1.5G Hz | Outlook | Crash | 2 | ... |
| 5 | 128M | 366MHz | Word | Normal | 2 | ... |
| 6 | 512M | 733MHz | Excel | Normal | 3 | ... |
| 7 | 192M | 366MHz | Excel | Normal | 5 | ... |
| 8 | 1024M | 2GHz | Outlook | Normal | 7 | ... |
| 9 | 512M | 1GHz | Word | Hang | 7 | ... |
| ... | ... | ... | ... | ... | ... | ... |

ANALYZING SOFTWARE USERS WITH INSTRUMENTATION DATA AND USER GROUP MODELING AND ANALYSIS

CROSS-REFERENCE TO RELATED APPLICATIONS

The present application is related to the following copending U.S. patent applications, assigned to the assignee of the present application, filed concurrently herewith and hereby incorporated by reference:

Software Reliability Analysis Using Alerts, Asserts, and User Interface Controls, U.S. Pat. No. 7,681,085;

Multidimensional Analysis Tool for High Dimensional Data, U.S. patent application Ser. No. 11/818,607;

Efficient Data Infrastructure for High Dimensional Data Analysis, U.S. patent application Ser. No. 11/818,879;

Software Feature Usage Analysis and Reporting, U.S. patent application Ser. No. 11/818,600;

Software Feature Modeling and Recognition, U.S. Pat. No. 7,680,645; and

Analyzing Software Usage with Instrumentation Data, U.S. patent application Ser. No. 11/818,611.

BACKGROUND

Understanding the way in which software users use software can be very valuable when working to improve the effectiveness and ease of use of software applications. Traditional ways to analyze software users include usability studies, user interviews, user surveys and the like.

Various data can be collected during actual software usage to obtain information related to how users use and otherwise interact with a software program. However, analyzing that data to obtain useful information about the users, including how to model and analyze a specific group of users, is a difficult problem.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which software instrumentation data collected from user sessions corresponding to one or more programs is analyzed, including by determining program usage metrics and/or command usage metrics. Information representative of the program usage metrics and/or the command usage metrics is output, such as in the form of a report. The software instrumentation data may be further analyzed, such as to determine at least one usage trend over time, and to determine user groups.

Examples of program usage metrics include session count information based on a number of application sessions, session frequency information based on a time measurement between sessions, running time information based on session time, session length information based on session time and session count, and/or depth of usage information based on a percentage of commands used. Examples of command usage metrics include user count information based on a number of users of the set who use the selected command, percentage of users information corresponding to a percentage of users of the set who use the selected command, session count information based on a number of sessions in which the selected command occurred, percentage of session information corresponding to a percentage of application sessions in which the selected command was used, click count information corresponding to a number of clicks corresponding to the selected command, percentage of click count information corresponding to a percentage of program clicks corresponding to the selected command, click count per user information based on click count and user count of the selected command, and/or click count per session information corresponding to a click count per session.

The software instrumentation data may be analyzed to determine at least one type of user, and for modeling a user group. For example, users may be categorized by their depth of usage, and/or by the types of activities in which they engage. Potential outliers may be identified based on command usage that is significantly different from the command usage of other users. Users may be located from their sessions based on session criterion comprising a dimension and a value for that dimension, where each dimension comprises a variable recorded in a session, a feature, or results computed from a plurality of variables.

A subset of sessions that meet specified session criteria based on a set of session data may be located, along with a subset of users based on users whose sessions meet specified user criteria. The subsets may be combined via Boolean logic to produce a result set.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards analyzing software usage and software users, such as for the purpose of improving software products such as application programs, and improving the user experience with those software products. To this end as described below, various aspects are directed towards collecting and analyzing various application-related usage data, referred to as software instrumentation data, in an attempt to understand the usage of an application program, including concepts such as how long, how much, how often and how extensive users use the application, the use of commands by users, and/or usage trends over time.

In other aspects, the software instrumentation data includes information about the types of users that use a program, and helps to define one or more groups of users. A user interface may be provided to help define and model a user group, along with an example language to model a user group and example ways to analyze a user group. As will be understood, the use of user groups provides mechanisms for software feature usage analysis and application usage analysis.

For purposes of understanding, the technology is described herein by use of examples, including those that operate in various environments, such as internal users (e.g., corresponding to employees of the enterprise that is analyzing the software) and external users. Further, the programs exemplified herein are generally a suite of application programs such as those provided as part of the Microsoft® Office software product suite. However, as will be understood, these are only non-limiting examples, and the technology is applicable to different user environments and different software products, including individual application programs and operating system components.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing in general.

Figure 1:
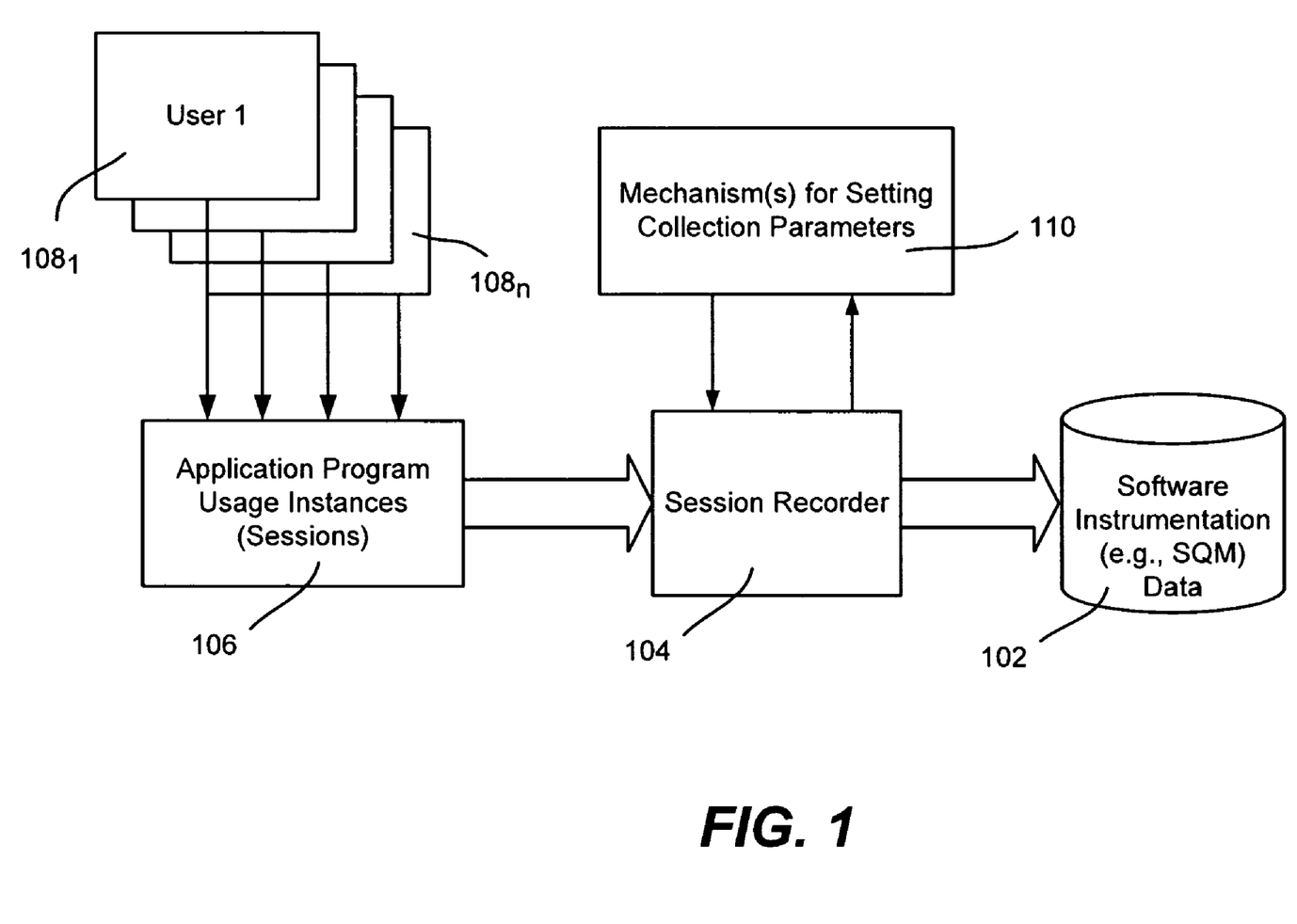
FIG. 1 shows an example representation of recording software instrumentation data for subsequent analysis.

Turning to FIG. 1, there is shown a mechanism for collecting software instrumentation data 102, including a session recorder 104 that collects various data from one or more application instances 106 corresponding to various users $108_1$-$108_n$, where n represents any practical number of users. The session recorder 104 may be per application instance/user, or may be a mechanism such as an agent on each computing device of a network that communicates with at least one data collection server component running on a network server or the like. One or more various mechanisms 110 allow a test operator or the like to set collection parameters, such as from which program or programs to collect the instrumentation data, from which users to collect data, how long a collection session should last (if the program is not ended by the user within that time limit) and so forth. Note that the mechanisms 110 represent any mechanisms that may be used at various points during which collection parameters can be set, e.g., during development of the session recorder, or as (or after) the instrumentation data is collected on the users' client machine and/or uploaded to servers.

In general, the instrumentation data 102 comprise data collected from each user session, where a session corresponds to actual usage by a user of an executing program. A typical session starts from the application start (e.g., by double clicking on the application executable or a document that launches the application executable, or by choosing the application from a start menu), and ends when the application is closed (e.g., by choosing "Exit" in the application or closing the application window). Sessions can also be time limited, e.g., if a session exceeds twenty-four hours, the session is ended and the instrumentation data to that point recorded (the application continues to run). Sessions can also end by non-normal termination of a program, e.g., because of program or system crashes.

Figure 2:
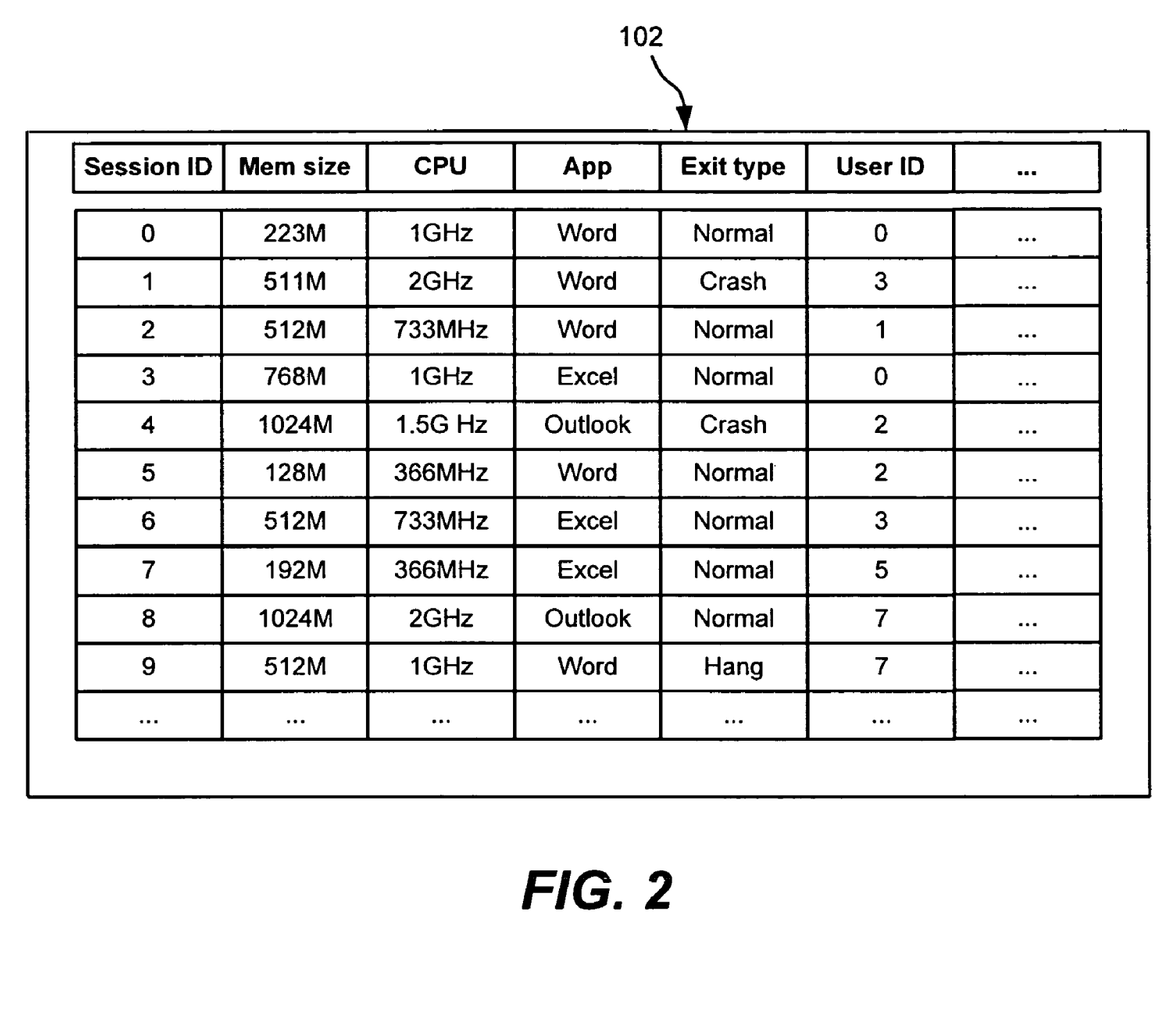
FIG. 2 shows a representation in a table format of example software instrumentation (e.g., software quality metrics) data saved for various program usage sessions by users of a suite of application programs.

FIG. 2 provides an example of one type of software instrumentation data 102, with some of the data (arranged in columns) collected for some number of sessions (arranged in rows); it is equivalent to have the sessions be in the columns and the rows represent the data. In one example implementation, each session is associated with some or all of the information shown in FIG. 2, including a session ID, a user ID, and an application name. Other information that is typically recorded includes the application version, a start time, an end time, the commands used during the session and still other data, such as the number of files opened and so forth. Note that in actual implementations, the instrumentation data 102 may be many thousands of dimensions.

Figure 3:
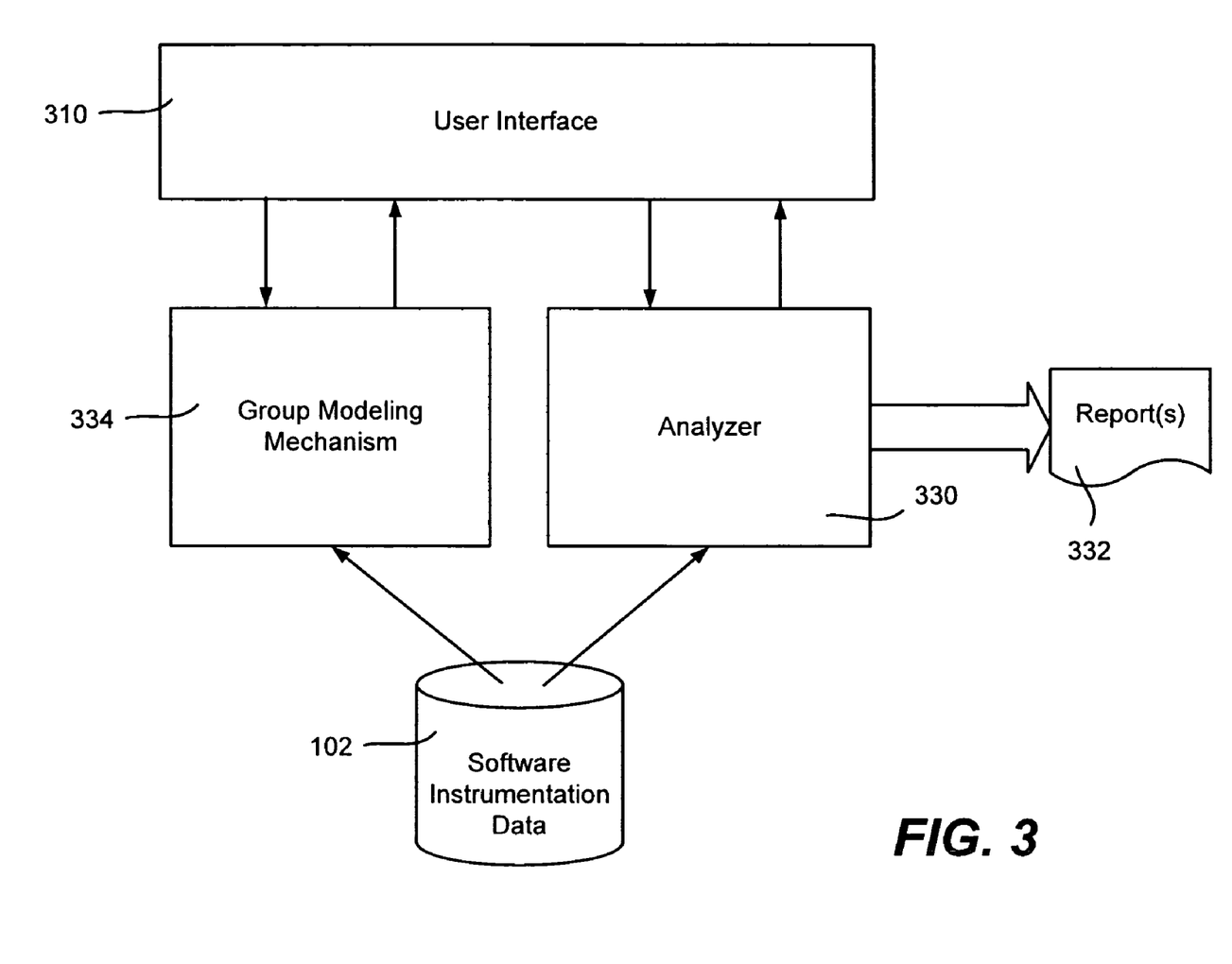
FIG. 3 shows an example representation of an analyzer for analyzing software instrumentation data and a mechanism for modeling groups of users based on the software instrumentation data.

To analyze software product usage, the software instrumentation data 102 is processed, such as to measure the overall usage of an application by a group of users. FIG. 3 shows example analysis components, including an analyzer 330 that generates a report 332 from the instrumentation data 102. Note that the data may be first pre-processed into any suitable data structure or set of data structures, such as described in the aforementioned U.S. patent applications entitled "Multidimensional Analysis Tool for High Dimensional Data" and "Efficient Data Infrastructure for High Dimensional Analysis." Further, the data may be accessed via a client/service architecture, such as described in the aforementioned U.S. patent application entitled "Analyzing Software Usage with Instrumentation Data," in which a data infrastructure system manages the data for the analysis and provides access to the data via APIs.

A user interface 310 (which may or may not be associated with or otherwise the same as the user interface 110 of FIG. 1) establishes the parameters, criteria and which metrics are used to analyze the instrumentation data 102. Also shown in FIG. 3 is a group modeling mechanism 334.

In one implementation, the metrics set forth in table below may be used for generating at least some of report 332 with respect to the usage of an application:

| | |
|---|---|
| Average session count | Average number of application sessions by these users. This indicates on average, how much the users have been using the application during a time period. One suitable calculation is: get the session count (total number of application sessions) of each user, and average across the users in the group. |
| Average session frequency | Average time between consecutive sessions by users. This indicates on average, how frequent the users use the application. One suitable calculation is: get the session elapse time (the time between the end of the last session and the end of the first session) of each user, get the session frequency (session elapse time divided by session count) of each user, average across the users. |
| Average total running time | Average total session time by users. This is another indication of on average, how much the analysis users have been using the application. One suitable calculation is: get the total running time (sum of the session time) of each user, average across the users. |
| Average session length | Average session time by users. This indicates on average, how much time users spend in each session using the application. One suitable calculation is: get the average session length (total running time divided by session count) of each user, average across the users. |
| Average depth of usage | Average percentage of total commands of the application used by users. This indicates how deep users use the application. One suitable calculation is: get the depth of usage (percentage of total application commands used by the user, where total application commands is the total number of distinct commands found in the command stream of the application so |

-continued

> far, and used by the user is defined as the command found at least once in the command stream of the user) of each user, average across the users. For example, users can be characterized as beginner, intermediate, advanced and expert users depending on their depth of usage, or some other levels may be used.

A distribution of the above measures can also be obtained by counting how many or what percentage of users have values that fall within an interval.

As part of the analysis processing and report 332 generation, the source of users may be specified. Some example user sources include all users from whom instrumentation data have been collected (All), users who are external customers and not internal employees of the company performing the analysis (External), users who are employees of the company performing the analysis (Internal), users who are from a particular group that the company performing the analysis has set up from which to collect data (e.g., a Study ID such as the beta participants of the next release of a software product), or another customized group.

In general, any filtering, grouping and sorting may be used in the processing of the instrumentation data; for example, a particular application and/or version for which the analysis is being conducted may be specified. The user interface 310 may be designed to help an operator filter, group and/or sort the data as desired, as well as to determine how the output should look and what results should be computed.

A typical example analysis report 332 summarizes the type of analysis performed, the parameters used (e.g., data source, program, build or version, time period of collection, user source, filtering criteria, user count and so forth). A summary section may show the metrics including session count, session frequency, average running time, average session length, and average depth of usage.

Figure 4:
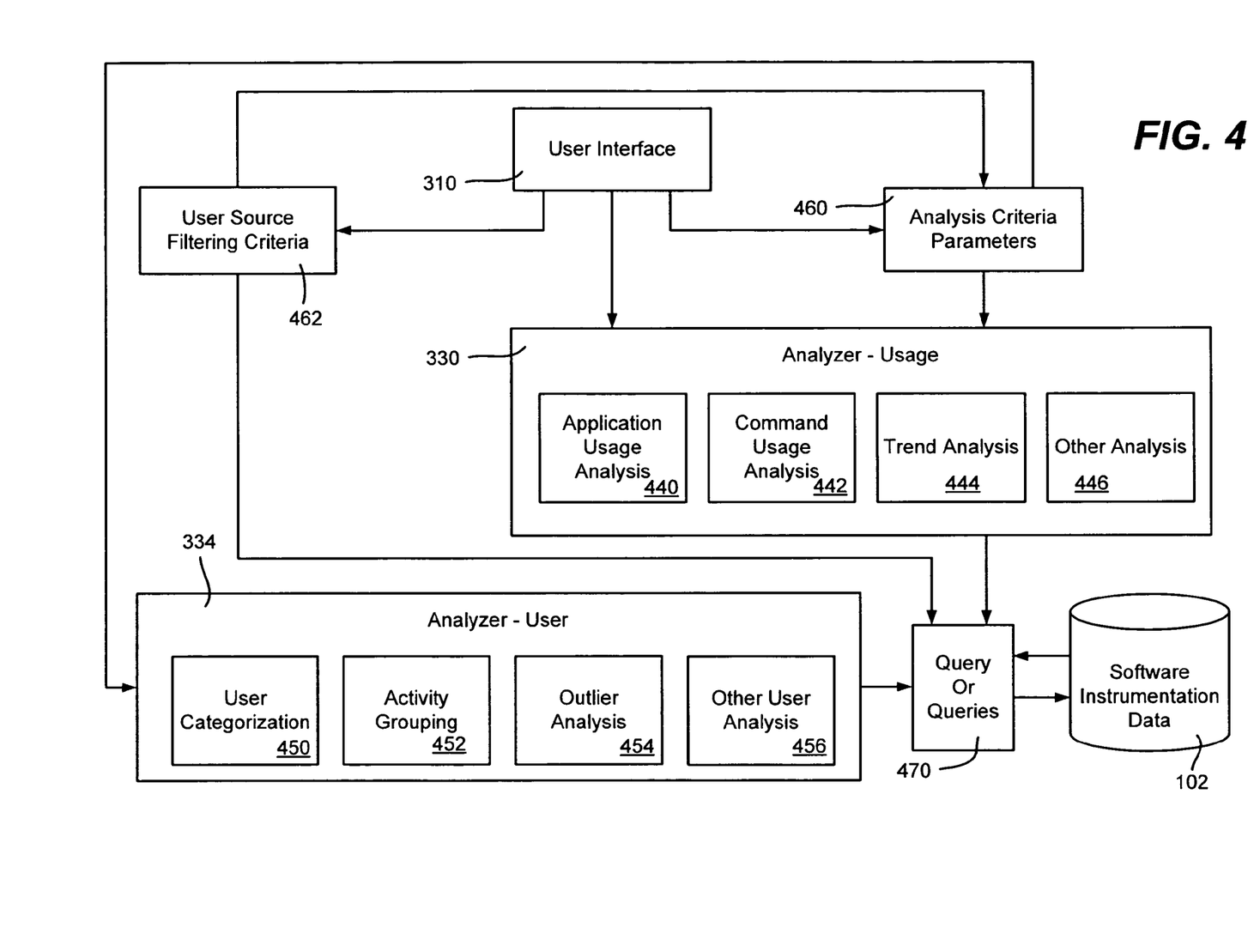
FIG. 4 shows a representation of various example concepts related to analyzing software instrumentation data and/or modeling groups of users.

FIG. 4 represents example types of analyses that may be performed by the analyzer 330, as well as group modeling concepts. For example, the above-described application usage analysis is represented by the block labeled 440. Alternatively, or in addition to usage analysis, the usage of commands (block 442) of an application by a group of users may be measured, for example with the metrics for each command set forth in the following table:

| | |
|---|---|
| User count | Number of users who use this command. |
| Percentage of users | Percentage of application users who use this command. |
| Session count | Number of sessions in which this command occurred. |
| Percentage of Sessions | Percentage of application sessions in which this command occurred. |
| Click count | Number of clicks that are of this command. |
| Percentage of click count | Percentage of application clicks that are of this command. |
| Click count per user | The ratio of click count of this command and user count. This shows on average, how many times a user uses a command. |
| Click count per session | The ratio of click count of this command and session. This shows on average, how many times a command occurs in a session. |

In this example, the application users, application sessions and application clicks described above refer to the total number of users, sessions and command clicks of the application for which command usage analysis is being performed. The total number of sessions of an application is the total number of sessions in which the application name (or other suitable identifier) that was recorded is the application of interest. The total number of users of an application is the total number of unique user identifiers (IDs) of the sessions of the application. The total number of command clicks of an application is the total number of command clicks in all the sessions of the application. Note that the application and version for which the analysis is being conducted, and the source of users, can be specified by the analyzer operator.

Another aspect with respect to analysis is referred to as trend analysis 444. More particularly, given the time information in the recorded instrumentation data, the trend of using an application may be measured, corresponding to the usage of an application over time. The application and version for which the analysis is being conducted and/or the source of users can be specified via the user interface 310. The trend data may be displayed as a table or a graph.

The period to analyze and the reporting interval may also be specified. The period to analyze can be an absolute period, e.g., the time period from a start date to an end date, or may be a relative period, e.g., each user's enrollment length, which is the time period from a user's first session to the last session. The reporting interval is the interval to report the measures, and for example may be monthly, weekly, daily, or any other suitable interval. Example measures may include:

| | |
|---|---|
| User count | Total number of users using the build and application during a reporting interval. |
| Session count | Total number of sessions of the build and application during a reporting interval. |
| Session Count Per User | Total number of sessions of the build and application divided by the number of users using the build and application during a reporting interval. |
| Cumulative Session Count Per User | Total number of sessions of the build and application divided by the number of users using the build and application from the start time of the period to analyze to the end of each reporting interval. |
| Cumulative Running Time Per User | Total session length of the users using the build and application divided by the number of users from the start time of the period to analyze to the end of each reporting interval. |

One or more other types of analysis may be performed, as represented in FIG. 4 by the block 446.

Other measures are directed towards users, and are represented in FIG. 4 via the group modeling block 334. User categorization (block 450) refers to categorizing users of an application based on their usage of the application. As described above, one way to categorize users is by depth of usage, which is related to the percentage of total application commands used by the user. Depth of usage is a measure of how extensively users use an application, and users can be categorized based on their depth of usage. For example, users can be categorized as "beginners" if their depth of usage is less than some threshold such as three (3.0) percent; "intermediate" if their depth of usage is between some range such as three and eight (3.0-8.0) percent; "advanced" if their depth of usage is between eight and twelve (8.0-12.0) percent; and "expert" if their depth of usage is greater than twelve (12.0) percent. Other categories and other thresholds/ranges may be used.

The commands of an application also may be clustered into representative activities of the application, as represented in FIG. 4 via block 452. For example, in a word processing program such as Microsoft® Word, the various commands can be classified into editing, formatting, managing files, viewing and navigating documents, printing, reviewing, tools, emailing, automating tasks and programmability, customization, reading and getting help.

Thus, another way to categorize users is by the types of activities in which they engage. For example, for a set of users, each of their levels of engagement in an activity can be measured by the ratio of the total number of command clicks of the activity and the total number of command clicks by the user across the sessions, such as exemplified in the table below:

|  | Activity 1 | Activity 2 | Activity 3 | ... |
|---|---|---|---|---|
| User 1 | 20.0% | 10.0% | 1.0% | ... |
| User 2 | 5.0% | 36.0% | 20.0% | ... |
| User 3 | 2.0% | 25.0% | 6.0% | ... |
| ... | ... | ... | ... | ... |

Using activity grouping, users can be categorized into groups based on usage, that is, each group of users may represent a type of use of the application. For example, a word processing program may have users who primarily use the editing functionalities and not much of anything else, other users who primarily use the formatting functionalities, and so forth. In this manner, analysis parameters 460 such as the application and version for which the analysis is being conducted, and the source of users can be specified via filtering criteria. The number of categories can also be specified.

Outlier analysis (block 454) refers to a type of user (a potential outlier) if his or her use of a command is substantially different from those of most other users. Various criteria can be used, such as the entropy of the occurrence distribution of each command. The smaller the entropy, the more unevenly distributed the occurrence of the command among the set of all users. For example, if the entropy is less than one-half (0.5), a first criterion is met.

More particularly, in one example implementation, an outlier is determined for a particular application, version/build and each command, by determining that if a command is only used by one user, and the average clicks per session is larger than some threshold number (e.g., 100), this user is identified as an outlier. Alternatively, if a command is used by more than one user, the entropy of the command is calculated as the following:

$$P_i = \frac{C_i}{C_{total}}$$

$$E = -\frac{\sum_{i=1}^{n} P_i \times Log(P_i)}{Log(n)}$$

where n is the total number of users who used the command, $C_i$ is the total number of clicks of the command by user i, and $C_{total}$ is the total number of clicks of the command.

If the entropy of a command is smaller than some threshold value, (e.g., 0.5), and the average clicks per session by a user is larger than some other threshold number (e.g., 100), this user is identified as an outlier.

The outlier analysis outputs all (or some specified subset of) users who are identified as outliers, including the application for which the user is considered as an outlier, total number of application sessions the user had, the command of unusual usage, total number of times the user used the command, number of application sessions where the user used the command more than 100 times.

Additionally, the average occurrence per session of the command by this user may be considered, e.g., the total occurrence of the command divided by application session count of the user. If the average occurrence per session is greater than some number, such as one-hundred, the second criterion is met. In this example, any user who meets the two criteria can be grouped and reported; in this example, the user is likely using automation.

To use a user group in analysis, a user group is defined and can thereafter be used in software feature usage analysis and application usage analysis. In the analysis configuration, the operator can specify the "User source" to be a user group. When the operator sets the user source to be a user group, the analysis is focused to that user group.

One approach to defining a user group is to define a set of sessions that meet certain criteria (block 462) based on per session data, define a user criterion specifying users whose sessions in a session set as a whole meet a certain criterion or criteria, and allow the specifying of multiple criteria mathematically combined in some way, e.g., using Boolean logic or weighted factors. For example, basic elements to define a user group may include user group, user criterion, union, intersection, and complement. Basic elements to define a session set may include: session set, session criterion, AND, OR and NOT. For example, in a user interface, the basic elements (or user modeling controls) may be listed on the left, with the user group and session set definition (user group modeling) on the right. To define a user group, the operator can drag the basic elements from the left to add to the right, and can also change the name of a session set or user group.

In one example implementation, a session criterion includes a "dimension" and a "value." A dimension may be any variable recorded in a session (e.g., OfficeApplication), a feature, (e.g., copy and paste, typically comprising a series of commands), and/or variables that are commonly used but are not directly recorded in a session, but rather are calculated from variables that are recorded. For example, ImportantBuild is based on several variables such as OfficeProductVer, OfficeMajorVer, OfficeMinorVer and OfficeDotBuild.

Once the operator selects a dimension, the operator may specify the value or values that are of interest. For example, if "feature" is selected as the dimension, the operator can specify a feature file.

By default, the logical relationship between session criteria is AND. In the above example, for each session in the session set, by default the operator may specify that OfficeApplication=OneNote AND ImportantBuild=Office 12 Beta 1. The operator may specify other types of logical relationships by selecting the basic elements (e.g., dragging from the left to add to the right).

Once the operator has defined a session set, the session set may be used to define a user group, e.g., by selecting and dragging a user criterion to the right. The user criterion may be named, with the user criterion condition or conditions specified that a user's sessions need to meet. For example, to be considered a "OneNote12Beta1User," a user needs to have at least one session that corresponds to OneNote Beta1 session.

Example measures that can be used to specify conditions are listed in the table below. The measures are calculated per user, e.g., for each user of the session set. In this example, if the chosen measure of a user meets the condition specified, the user is included in the user group:

| | |
|---|---|
| Average Session Length | Average session length of the sessions of a user. |
| Crash Ratio | Ratio of the number of sessions that crashed (crash count) to the total number of sessions of a user. |
| Depth of Usage | Percentage of total commands in software instrumentation data that are used by a user. |
| Enrollment Length | Time between earliest session and latest session of a user. |
| Failure Ratio | Ratio of the number of sessions that failed (such as crash and hang) to total number of sessions of a user. |
| MTTC (mean time to crash) | The ratio of total session length to the total number of sessions that crashed of a user. |
| MTTF (mean time to failure) | Ratio of total session length to total number of sessions that failed of a user. |
| Session Count | Total number of sessions of a user. |
| Session Frequency | Average time between consecutive sessions of a user's sessions. |
| Total Running Time | Total session time of a user's sessions. |

The operator may also specify other criteria, such as that the total time since the user's first session until now needs to be less than a month.

The relationship between the user criteria in a user group is "Intersection" by default, e.g., the above examples would specify that the user group "OneNote 12 Starters" is the intersection of "OneNote12Beta1Users" and "OneNote12Beta1LessThanAMonth" users. The operator may specify other types of relationships via the basic elements, e.g., by dragging the basic elements on the left to add to the right. In this way, straightforward user interface interaction defines a user group. Note that the operator can also define a user group in other ways, e.g., via links shown when hovering on the user count of a category ("bucket") that if selected provides a "user groups" creation dialog, wizard or the like.

To analyze a user group once defined, the instrumentation data may be queried to get results for the user group. As represented in FIG. 4, the analysis criteria/parameters 460 and user group modeling based on filtering parameters 462 thus may be used to generate the query 470. The query results may then be formatted into the report 332.

Example query results that may be included in the report 332 may include some or all of the data set forth in the following table, as well as additional data:

| | |
|---|---|
| User Count | Total number of users who are in the user group, i.e. who meet the criteria of the user group. |
| Data Characteristics | Total number of users and sessions for the applications and builds. |
| User counts | User counts for each user criterion and for each logical group. |
| Session counts | Session count for each session set, session criterion and logical group. |

Figure 5:
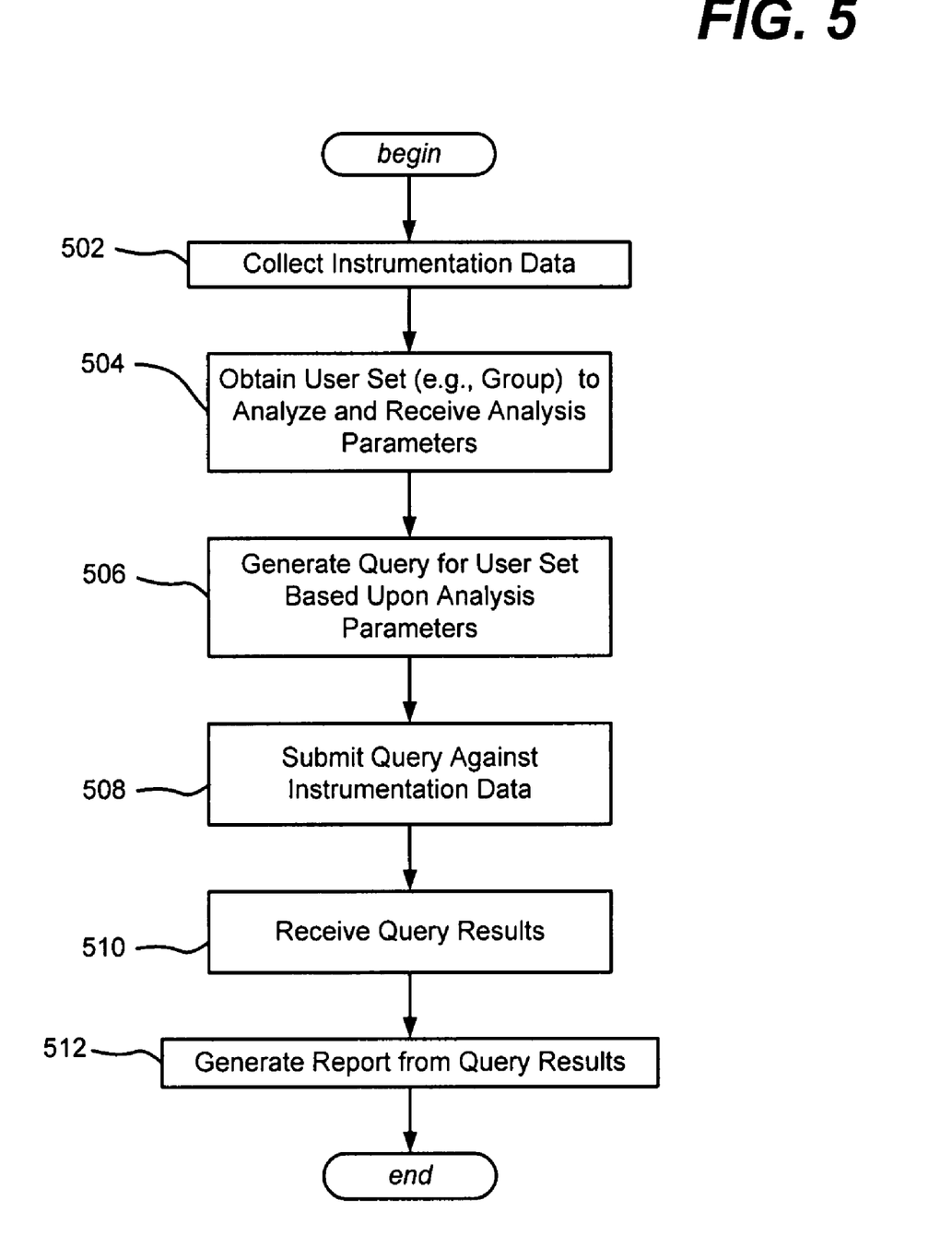
FIG. 5 is a flow diagram representing various example concepts related to analyzing software instrumentation data and/or modeling groups of users.

FIG. 5 summarizes an overall example process, beginning at step 502 which represents collecting the software instrumentation data. As is readily understood, the software instrumentation data may be collected at any previous time, not necessarily just prior to analysis.

Step 504 represents obtaining the analysis criteria (e.g., application usage, command usage, trend analysis and/or others), and obtaining the user set, which may be all, external, internal, a user group and so forth as set above. Step 506 generates the query from the operator-input analysis and/or user filtering criteria.

Step 508 represents submitting the query against the software instrumentation data (in any appropriate format), with step 510 representing receiving the query results. Step 512 represents generating the report, which may include performing calculations on the results as needed to match the operator's requirements. For example, as described above, some of the report can include information that is not directly measured but is computed from a combination of two or more measured sets of data.

Exemplary Operating Environment

Figure 6:
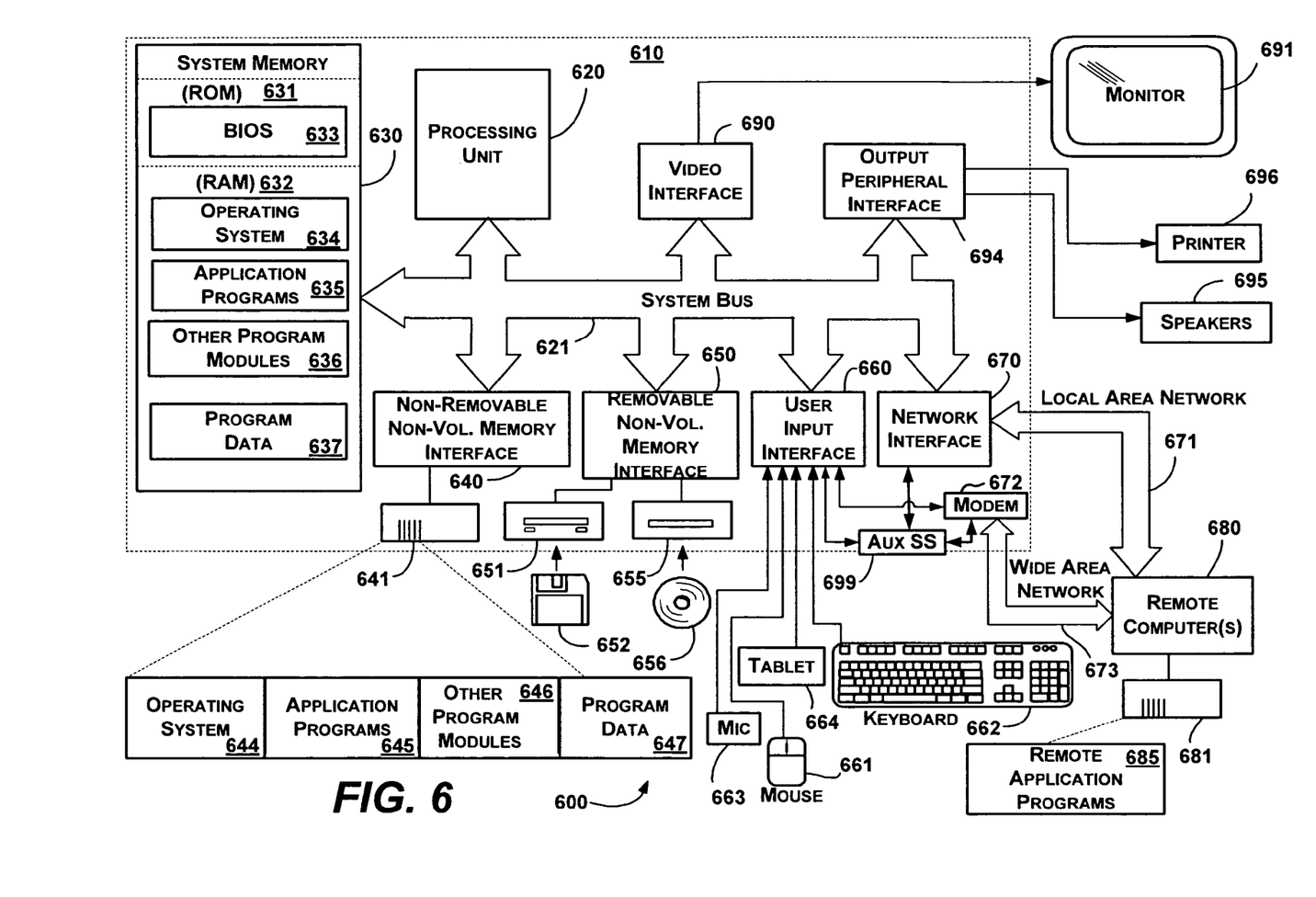
FIG. 6 is an illustrative example of a general-purpose computing environment into which various aspects of the present invention may be incorporated.

FIG. 6 illustrates an example of a suitable computing system environment 600 on which the collection, analysis and/or group modeling mechanisms (FIGS. 1 and 2) may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component 674 such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are exemplary and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising: analyzing software instrumentation data collected from user sessions corresponding to one or more programs and one or more commands associated with the user sessions, wherein the analyzing the software instrumentation data includes determining program usage metrics, command usage metrics and at least one usage trend over time; and
upon determining the program usage metrics, command usage metrics and at least one usage trend over time, outputting information representative of at least one of the program usage metrics, the command usage metrics, and at least one usage trend over time.

2. The method of claim 1 further comprising, collecting the instrumentation data during actual user sessions.

3. The method of claim 1 wherein determining the program usage metrics comprises determining for a set of users, session length information based on session time and session count, depth of usage information based on a percentage of commands used, and at least one of: session count information based on a number of application sessions, session frequency information based on a time measurement between sessions, running time information based on session time, session length information based on session time and session count.

4. The method of claim 1 wherein determining the command usage metrics comprises determining for a set of users and a selected command, session count information based on a number of sessions in which the selected command occurred, percentage of users information corresponding to a percentage of users of the set who use the selected command, and at least one of: user count information based on a number of users of the set who use the selected command, percentage of session information corresponding to a percentage of application sessions in which the selected command was used, click count information corresponding to a number of clicks corresponding to the selected command, percentage of click count information corresponding to a percentage of program clicks corresponding to the selected command, click count per user information based on click count and user count of the selected command, and click count per session information corresponding to a click count per session.

5. The method of claim 1 wherein analyzing the software instrumentation data to determine at least one usage trend over time comprises determining at least one of: user count information corresponding to a number of users that used a program during a reporting interval, session count information corresponding to a number of sessions of a program during a reporting interval, session count per user information based on a number of sessions and a total number of users that used a program during a reporting interval, running time per user information corresponding to a session length of users and a number of users that used a program during a reporting interval, cumulative session count per user information corresponding to a total number of sessions and a number of users from a start time of a period to analyze to an end of each reporting interval, and cumulative running time per user information corresponding to a session length of users that used a program and a number of users from a start time of a period to analyze to an end of each reporting interval.

6. The method of claim 1 further comprising, analyzing the software instrumentation data to determine at least one type of user.

7. The method of claim 6 wherein analyzing the software instrumentation data to determine at least one type of user comprises categorizing users by at least one of depth of usage and categorizing users by the types of activities in which they engage.

8. The method of claim 1 further comprising, analyzing the software instrumentation data to determine at least one potential outlier corresponding to command usage that appears different from command usage of other users.

9. The method of claim 1 wherein analyzing the software instrumentation data to determine at least one potential outlier comprises computing an entropy value corresponding to an occurrence distribution of a command, computing an average occurrence per session of the command usage by a potential outlier, and using the entropy value or the average occurrence per session, or both, as outlier criterion or criteria.

10. The method of claim 1 further comprising, locating a subset of the user sessions based on at least one session criterion, wherein each session criteria comprises a dimension and a value for that dimension, and each dimension comprises a variable recorded in a session, a feature, or a set of one or more variables computed from a plurality of variables recorded in a session, and wherein analyzing the information corresponding to the software instrumentation data comprises analyzing the subset.

11. The method of claim 10 wherein locating the subset comprises mathematically combining each of at least two session criteria.

12. The method of claim 1 further comprising, providing a mechanism for modeling a user group, including providing an interface for receiving one or more measures that specify one or more conditions that any user needs to meet in order to belong to the user group, and locating the users from the software instrumentation data based on the one or more measures.

13. The method of claim 12 wherein locating the users comprises determining at least one of: session length information corresponding to a session length of the sessions of a user, crash information corresponding to a number of sessions of a user that crashed, depth of usage information corresponding to which commands were used by a user, enrollment length information corresponding to a time between an earliest session and a latest session of a user, failure information corresponding to a number of sessions that failed of a user, mean time to crash information corresponding to session length and sessions of a user that crashed, mean time to failure information corresponding to session length and number of sessions of a user that failed, session count information corresponding to a total number of sessions of a user, session frequency information corresponding to time between consecutive sessions of a user, and total running time information corresponding to total session time of sessions of a user.

14. A computer-readable storage medium having computer executable instructions, which when executed perform steps comprising,
- analyzing software instrumentation data collected from user sessions corresponding to one or more programs and one or more commands associated with the user sessions, wherein the analyzing the software instrumentation data includes determining program usage metrics and command usage metrics and at least one usage trend over time; and
- upon determining the program usage metrics and, command usage metrics and at least one usage trend over time, outputting information representative of at least one of the program usage metrics, the command usage metrics, and at least one usage trend over time.

15. In a computing environment, a system comprising: an analyzer that processes information corresponding to software instrumentation data recorded from user software program usage sessions to produce a first subset comprising software usage data; wherein the analyzer comprises means for performing a command usage analysis, an application usage analysis, and a trend analysis;
- a group modeling mechanism that processes the information corresponding to the software instrumentation data and a second subset comprising user data; and
- means for combining the first subset with the second subset to provide an output that corresponds to a selected group of users and their software program usage.

16. The system of claim 15 further comprising a user interface for facilitating selection of one or more criteria by which the first subset and second subset are located from the information.

17. The system of claim 15 further comprising means for recording the software instrumentation data.

* * * * *

UNITED STATES PATENT AND TRADEMARK OFFICE
CERTIFICATE OF CORRECTION

PATENT NO. : 7,739,666 B2
APPLICATION NO. : 11/818610
DATED : June 15, 2010
INVENTOR(S) : Wenli Zhu et al.

It is certified that error appears in the above-identified patent and that said Letters Patent is hereby corrected as shown below:

In column 4, line 32, after "in" insert -- the --.

In column 4, line 33, after "of" insert -- the --.

Signed and Sealed this
Tenth Day of May, 2011

David J. Kappos
*Director of the United States Patent and Trademark Office*